(12) United States Patent
Clingman et al.

(10) Patent No.: US 7,889,115 B2
(45) Date of Patent: Feb. 15, 2011

(54) SYSTEM AND METHOD FOR TRACKING AND IDENTIFYING AIRCRAFT AND GROUND EQUIPMENT

(75) Inventors: Dan J. Clingman, Milton, WA (US);
Ted D. Whitley, Lopez Island, WA (US);
Jack Thiesen, Plymouth, MI (US);
Edgar Jacobi, Northville, MI (US);
Glenn S. Bushnell, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/363,559

(22) Filed: Jan. 30, 2009

(65) Prior Publication Data

US 2010/0194622 A1  Aug. 5, 2010

(51) Int. Cl.
*G01S 13/74* (2006.01)
(52) U.S. Cl. .................. 342/42; 342/146; 342/149; 370/310; 375/211
(58) Field of Classification Search .............. 342/37, 342/270
See application file for complete search history.

(56) References Cited

U.S. PATENT DOCUMENTS

| | | | |
|---|---|---|---|
| 5,742,253 A * | 4/1998 | Conroy et al. | 342/372 |
| 2006/0166681 A1* | 7/2006 | Lohbihler | 455/456.2 |
| 2008/0266166 A1* | 10/2008 | Schuchman | 342/37 |

* cited by examiner

*Primary Examiner*—Thomas H Tarcza
*Assistant Examiner*—Timothy A Brainard
(74) *Attorney, Agent, or Firm*—Haynes & Boone, LLP.

(57) ABSTRACT

In accordance with one or more embodiments of the present disclosure, systems and methods disclosed herein provide for tracking of objects, aircraft, vehicles, and ground equipment in a tracking area, such as an airspace and/or an airport terminal area. One embodiment of a tracking system of the present disclosure comprises a signal monitoring component adapted to communicate with an object, such as an aircraft, when the object enters the tracking area. The signal monitoring component is adapted to transmit a monopulse beacon query signal to the object and receive a monopulse beacon response signal from the object. The tracking system further comprises an interface component adapted to process the received monopulse beacon response signal from the object, initialize a beacon transponder on the object, and assign a network address to the object.

15 Claims, 8 Drawing Sheets

SYSTEM AND METHOD FOR TRACKING AND IDENTIFYING AIRCRAFT AND GROUND EQUIPMENT

TECHNICAL FIELD

The present invention relates generally to tracking systems and, more particularly, to a system and method for tracking and identifying aircraft and ground equipment.

BACKGROUND

A conventional system for identifying and tracking aircraft and ground vehicles is the Air Traffic Control Radar Beacon System (ATCRBS), which comprises three components: 1) ground interrogation equipment, 2) transponder equipment located on aircraft and ground vehicles, and 3) surface movement radar (SMR). The ground interrogation equipment comprises two types of radar systems: 1) the primary surveillance radar (PSR), and 2) the secondary surveillance radar (SSR). Many conventional PSR and SSR radar antennas in use today are of the mechanically-operated, dish type.

PSR operates using traditional radar principles, transmitting radio pulses and listening for and timing the reflections from the skin or other metal components of aircraft. PSR provides air traffic control (ATC) with range and bearing of aircraft. PSR has no capability to specifically indentify aircraft or ground vehicles.

SSR, on the other hand, provides ATC with unique information about the aircraft type and altitude. This information is provided via the squitter and transmits information that the aircraft has regarding its own position. SSR relies exclusively on transponders located on aircraft for identification and location information. The equipment installed in an aircraft is the transponder itself, usually mounted in the instrument panel or avionics rack, and a small UHF (ultra-high frequency) antenna, mounted on the bottom of the aircraft fuselage. Many commercial aircraft have an antenna on top of the fuselage, and either or both antennas can be selected by the flight crew.

SMR provides surveillance of aircraft and vehicle movement on airport runways and taxiways. SMR is also, in many instances, a mechanically operated, dish type antenna system. Even though PSR and SSR can be integrated, SMR functions as a separate system. There are separate displays for the SMR data on an ATC console. SMR does not have capability to identify aircraft or ground vehicles, and SMR relies on transponders on the aircraft or vehicle for identification.

Accordingly, in conventional tracking systems, three radar systems are needed: the primary surveillance radar (PSR), the secondary surveillance radar (SSR), and the surface movement radar (SMR). Hardware and software for these is unique to each system and is not interchangeable. Therefore, initial cost, upgrades, and maintenance typically require 2 to 3 times the resources that a single system requires. Moreover, conventional PSR, SSR, and SMR systems use mechanical dish radars. These huge mechanical dish radars are expensive to install, have numerous failure modes, and require high maintenance.

As such, there currently exists a need to improve radar tracking and identifying systems for aircraft and ground vehicles in airspace and airport terminal areas.

SUMMARY

In accordance with one or more embodiments of the present disclosure, systems and methods disclosed herein provide for monitoring, tracking, and identifying objects, such as vehicles including aircraft and ground based equipment (e.g., aircraft support equipment), in a tracking area, such as an airspace and/or an airport terminal area. A system for tracking an object in a tracking area comprises a signal monitoring component adapted to communicate with the object when the object enters the tracking area, wherein the signal monitoring component is adapted to transmit a query (e.g., a monopulse beacon query signal) to the object and receive a response (e.g., a monopulse beacon response signal) to the query from the object. The system further comprises an interface component adapted to process the received response from the object, initialize a beacon transponder on the object, and assign a network address to the object.

In various implementations, the signal monitoring component comprises a radar assembly, device or component having a radar transmitter and receiver adapted to communicate with the beacon transponder on the object. The interface component comprises a processing component adapted to interface with the signal monitoring component to process the received response from the object, initialize the beacon transponder on the object, and assign the network address to the object via the signal monitoring component. The interface component is adapted to set a pseudo-random noise (PN) code for the beacon transponder on the object. The signal monitoring component is adapted to transmit the query to the beacon transponder on the object via a communication channel and receive the response to the query via the communication channel. The response to the query includes at least one of identification information related to the object, position information related to the object, velocity information related to the object, and time of response. In various aspects, a monopulse radar is used to measure position information and/or velocity information from a beacon signal, wherein the position information and/or velocity information is derived from the responding object, such as an aircraft or ground vehicle.

In accordance with one or more embodiments of the present disclosure, a method for tracking an object in a tracking area comprises transmitting a query (e.g., a monopulse beacon query signal) to the object when the object enters the tracking area, receiving a response (e.g., a monopulse beacon response signal) to the query, processing the received response to the query, initializing a beacon transponder on the object, and assigning a network address to the object.

The scope of the present invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like devices illustrated in one or more of the figures.

DETAILED DESCRIPTION

In accordance with one or more embodiments of the present disclosure, a single radar system is provided with simple hardware and software components to provide airborne and ground traffic information to air traffic controllers. An airport air traffic control (ATC) system is provided to track airport airspace and ground space objects in a single system to effect safe and efficient operation under conditions of increased airport vehicle crowding and traffic conditions. The tracking system of the present disclosure utilizes low cost, scalable passive and active phased array radars comprising uniform, modular types of hardware and software components for the entire radar tracking system. The ATC phased array radar system comprises a four-channel monopulse receiver with one or more beacon transmitters on the object being tracked. The monopulse receiver may be adapted to operate at X-Band and/or Ka Band to obtain azimuth and elevation angles of the objects tracked in the air or on the ground, e.g., to 300 microradians accuracy and 1 meter range resolution. The monopulse receiver and beacon measure full state vector information about the object being tracked.

In accordance with one or more embodiments of the present disclosure, a monopulse radar is used to measure object information (e.g., identification information, position information, and/or velocity information) via one or more monopulse beacon signals from an object (e.g., an aircraft and/or ground vehicle). In various implementations, the object information (e.g., position information and/or velocity information) may be derived from the responding object via, e.g., one or more monopulse beacon signals, from the object.

In accordance with one or more embodiments of the present disclosure, the radar system provides a communication channel to the beacon electronics on the object by which a unique identification is applied to the object while the object is in the sphere of control of the ATC. This identification is broadcast back to the ATC periodically while the object is in the sphere of control of the ATC. The use of programmable PN modulation codes are adapted to originate from the radar, and in one aspect, only the beacon with the correct PN code may be measured to reduce confusion. The system of the present disclosure is adapted to interrogate by assigning a unique address to each aircraft when entering the range of the radar, and the radar does this by periodically broadcasting a query, which requests uninitialized aircraft to respond. Uninitialized aircraft responds with a permanent identification (ID) code, which may be sent at least once, twice, or three or more times with a random time delay between each transmission to reduce response collisions. The probability of a collision on a plurality of transmissions is small, and in the event that this occurs, the aircraft may be acquired on the radar in a next initialization query. In one aspect, when the radar receives the permanent ID of the uninitialized aircraft, the radar's network ID for the aircraft and the seed for its unique PN code is sent back to each uninitialized aircraft. Accordingly, the aircraft are then queried sequentially as the radar services its field of view (FOV).

Figure 1A:
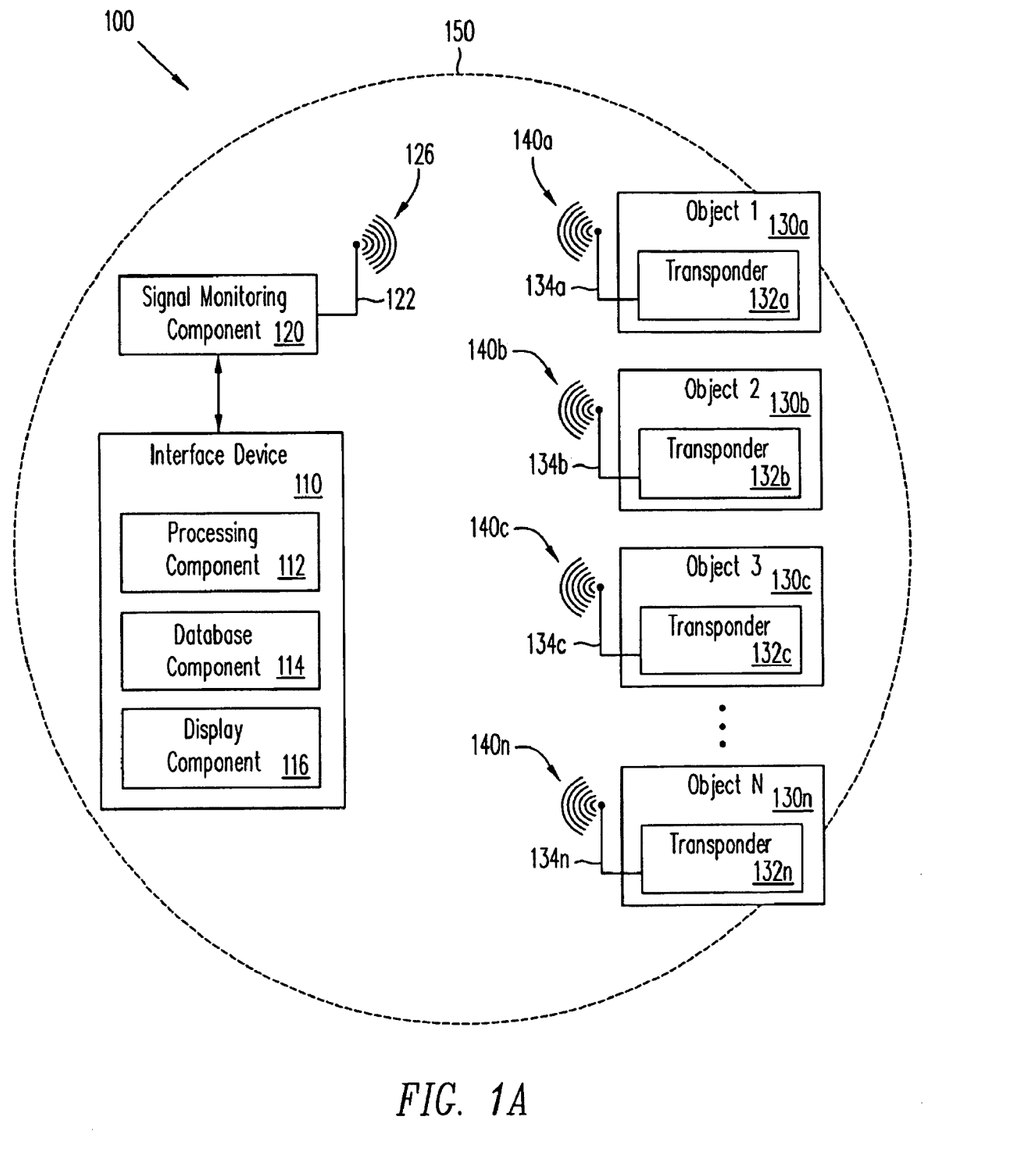
FIGS. 1A-1B shows various block diagrams of systems for monitoring, tracking, and identifying objects, such as aircraft and ground equipment, in accordance with one or more embodiments of the present disclosure.

FIG. 1A shows one embodiment of a block diagram of a system 100 for monitoring, tracking, and identifying air and ground equipment. The system 100 comprises an interface device 110 adapted to interface and communicate with a signal monitoring component 120 to facilitate tracking of one or more objects, vehicles, or equipment 130 (e.g., aircraft, service vehicles, ground equipment, and service equipment) within a tracking area 150 (e.g., air traffic control area and/or airport terminal area).

It should be appreciated that the system 100 may comprise any number (N) of objects 130a, 130b, 130c, . . . 130n (i.e., object 1, object 2, object 3, . . . object N) within the tracking area 150 without departing from the scope of the present disclosure. The system 100 may also comprise one or more interface devices 110 and signal monitoring components 120 without departing from the scope of the present disclosure. Moreover, it should also be appreciated by those skilled in the art that the signal monitoring component 120 may be integrated as part of the interface device 110 or vice versa, without departing from the scope of the present disclosure.

The system 100, as described in various embodiments disclosed herein, utilizes beacon monitoring techniques (e.g., transponder communication between the interface device 110, the signal monitoring component 120, and the one or more objects 130) for identifying object positions within the tracking area 150. In one implementation, each object 130 is adapted to receive a request beacon signal 126 from the interface device 110 via the signal monitoring component 120 and retransmit a response beacon signal 140 to the interface device 110 via the signal monitoring component 120 in the tracking area 150. As shown in FIG. 1A, each object 130 comprises at least one transponder 132 with an antenna 134 that is adapted to receive and retransmit beacon signals 126, 140 from and to the interface device 110 via the signal monitoring component 120 within tracking area 150.

In one implementation, the transponders 132 (i.e., transmitter-responder) comprise automatic communication devices (e.g., radio beacon transceivers) that are adapted to receive and retransmit a signal (e.g., a beacon signal) on a frequency that may be different from the received signal frequency. The transponders 132 may be adapted to transmit a predetermined message in response to a predefined received signal. The transponders 132 may be adapted to generate a reply signal (e.g., a reply beacon signal) when interrogated by the interface device 110 via the signal monitoring component 120. In aviation systems, the transponders 132 are adapted to assist with identification on radar and collision avoidance systems.

Figure 2A:
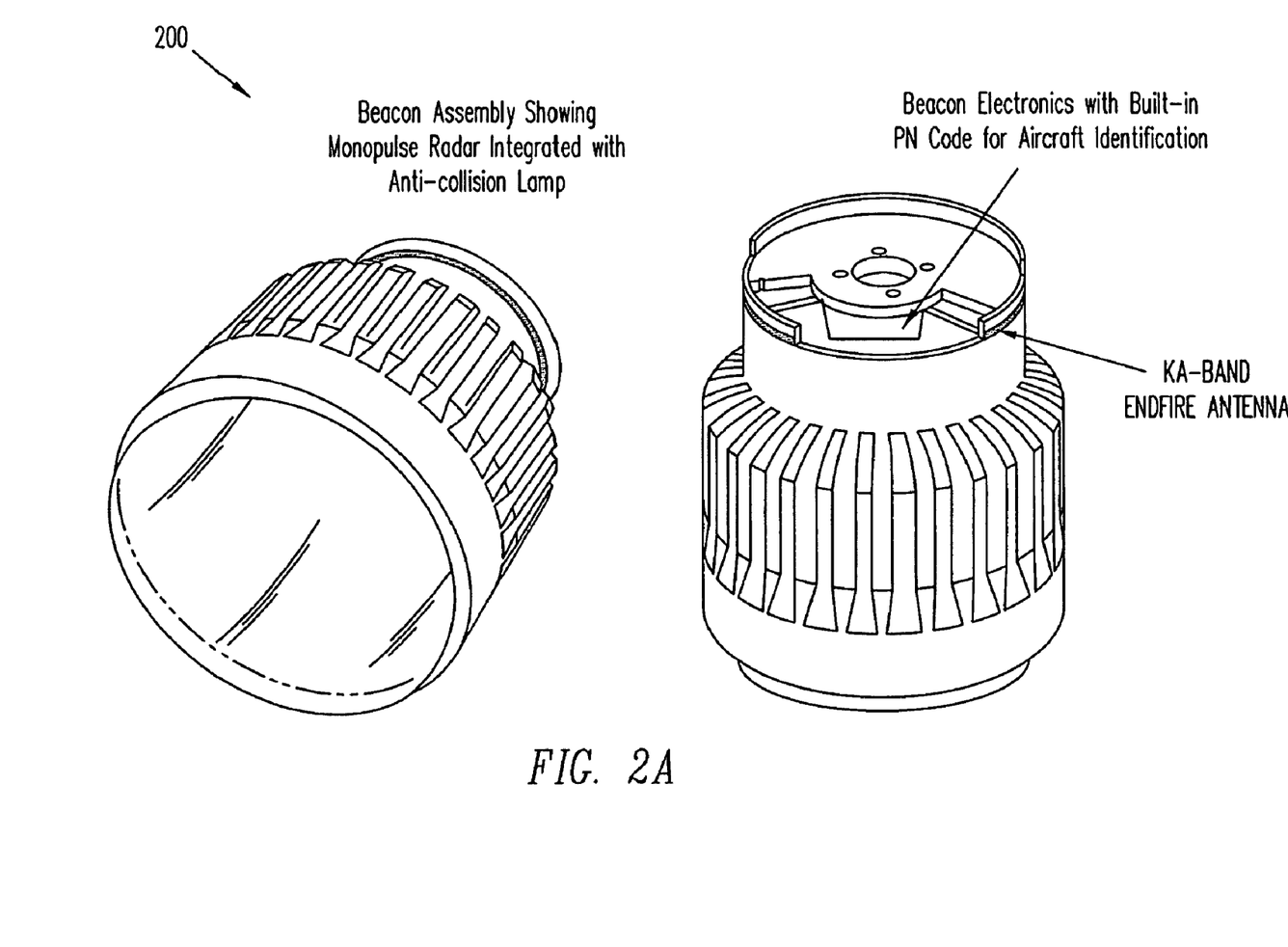
FIG. 2A shows a beacon assembly, in accordance with one or more embodiments of the present disclosure.

In one implementation, referring to FIG. 2A, the transponders 132 comprise a VISAT beacon assembly 200 (i.e., radar beacon and electronics integrated with anti-collision lamp mounted on an aircraft). In the aviation industry, VISAT is generally known as Vertically Integrated Scalable Antenna Tiles. The transponders 132 utilize a pseudo-random noise (PN) code integrated with the radar beacon electronics. The beacon assembly 200 comprises a radar monopulse beacon that is easily integrated into anti-collision lamps on aircraft, ground vehicles, and/or ground equipment. The radar monopulse beacon signal from one or more objects in the tracking area 150 is measured via the VISAT ground receiver components 120, 122 and 126, which are adapted to provide one or more motion characteristics of the object (e.g., position and velocity of an aircraft). This beacon-receiver implementation improves position and velocity accuracy independent of transponder instrumentation onboard the object being tracked, which may preclude the transponder from sending erroneous or intentionally deceptive position and velocity information. The radar monopulse beacon provides specific identification independent of the object being tracked. The unique PN code improves security in that no transmission that has not been preprogrammed may be received. Moreover, as is understood in the art, the use of PN codes spreads the spectrum, thereby reducing the effects of noise.

The interface device 110, in one embodiment, comprises a processing component 112, a database component 114, and a display component 116. As shown in FIG. 1A, the interface device 110 interfaces and communicates with at least one signal monitoring component 120 having at least one antenna component 122 (e.g., phased array antenna component) that is adapted to transmit beacon signals 126 to each object 130 and receive beacon signals 140 from the objects 130 within tracking area 150.

The processing component 112, in one embodiment, comprises a processor, such as, e.g., a microprocessor, microcontroller, digital signal processing (DSP) device, or some other generally known processing device configured to process and execute various instructions in accordance with embodiments of the present disclosure. In one aspect, the processing component 112 may be configured to process and execute operational code and instructions, such as, e.g., an x86 processor for running operating systems and applications. In another aspect, the processing component 112 is adapted to process analog and/or digital signals, data, and/or information.

The database component 114, in one embodiment, is utilized for storing and archiving searchable information, which may be made available to the processing component 112 to identify particular beacon signals 140 and particular objects or vehicles 130 transmitting the particular beacon signals 140. For example, the signal monitoring component 120 transmits a beacon signal 126 (e.g., interrogation request) to one or more of the objects or vehicles 130a, 130b, 130c, . . . 130n. In response, the signal monitoring component 120 receives a particular beacon signal 140a, 140b, 140c, . . . 140n (e.g., response beacon signal) from a particular object or vehicle 130a, 130b, 130c, . . . 130n. The processing component 112 processes the received beacon signal 140a, 140b, 140c, . . . 140n and identifies the object or vehicle 130a, 130b, 130c, . . . 130n related to the received beacon signal 140a based on one or more parameters of the received beacon signal 140a, 140b, 140c, . . . 140n. In one aspect, one or more parameters for the particular beacon signal 140a, 140b, 140c, . . . 140n may be stored and/or archived in the database component 114 for further processing and retrieval. In another aspect, the one or more parameters may indicate identifying information for the particular object or vehicle 130a, 130b, 130c . . . 130n, such as type of vehicle, size of vehicle, fuel requirements, position or location of vehicle, velocity of vehicle, time (state vector) of vehicle, etc.

The display component 116, in one embodiment, is utilized for displaying data and information to a user, operator, controller, or administrator. The display component 116 comprises, e.g., a visual monitor or console (e.g., an air traffic control console) for a user to view data and information provided by the processing component 112. The displayed data and information may be related to the position or location of each of the objects 130 in the tracking area 150. As such, in one implementation, the displayed data and information may comprise a positional map that shows the position of each object 130 relative each other so as to allow a user to determine movements and orientation of each object 130.

The signal monitoring component 120, in one embodiment, comprises a wireless signal transceiver (e.g., a radar device or some sort of wireless signal transceiver adapted for use with one or more radio frequencies (RF), infrared frequencies (IRF), and/or microwave frequencies (MWF)) that is adapted to transmit beacon signals 126 to the transponders 130 and receive beacon signals 140 transmitted from transponders 132 of objects 130 within tracking area 150. The signal monitoring component 120 is coupled to the antenna 122 for transmitting wireless beacon signals 126 and receiving wireless beacon signals 140. The antenna 122 is adapted for use with the system 100, the interface device 110, the signal monitoring device 120, the object transponders 132, and the object antennas 134. The signal monitoring component 120, in various implementations, may comprise an encoder, a decoder, a modulator, a demodulator, one or more amplifiers, and various other wireless communication components, as is generally known in the art, without departing from the scope of the present disclosure.

In one implementation, the signal monitoring component 120 comprises a phase array based monopulse angle of arrival (AOA) device or sensor, which is used to measure, monitor and/or track the one or more beacon signals 140a, 140b, 140c, . . . 140n transmitted from respective transponders 132a, 132b, 132c, . . . 132n in the tracking area 150. As described herein, the received information (i.e., beacon signals) is used to coordinate operations of the tracking area 150, such as aircraft control operations and airport terminal operations. Accordingly, in one aspect, a communication channel may be provide between each beacon transponder 132 and the interface device 110 via the signal monitoring component 120, which may include an angle of arrival (AOA) sensor.

As described herein, a monopulse radar device is used to obtain object information (e.g., identification information, position information, and/or velocity information) via one or more monopulse beacon signals from an object (e.g., an aircraft and/or ground vehicle). In various embodiments, the object information (e.g., position information and/or velocity information) may be derived from the responding object via, e.g., one or more monopulse beacon signals, from the object.

The signal monitoring component 120 in conjunction with the interface device 110, according to embodiments disclosed herein, is adapted to monitor and track beacon equipped objects, vehicles, and equipment (e.g., aircraft and ground based vehicles and equipment, such as 130a, 130b, 130c, . . . 130n) in and around the tracking area 150 (e.g., an air traffic control are and/or an airport terminal area), which allows users, operators, and/or officials (e.g., air traffic controllers) in a stationary building (e.g., an air traffic control tower) to monitor air traffic, monitor ground operations, reduce aircraft clashes, and reduce runway interferences and collisions. The system 100 also streamlines airport traffic management (ATM) to allow for cost savings in fuel.

In one implementation, the signal monitoring component 120 comprises a 35 GHz phase array angle of arrival (AOA) sensor that is adapted to provide azimuth angle and elevation angle to a beacon signal to a particular resolution, such as, e.g., 300 micro-radians resolution. In one aspect, each of the transponders 132a, 132b, 132c, . . . 132n, in conjunction with the VI SAT receiver components 120, 122 and 126, are adapted to provide range resolution to within a particular measurement, such as 1 meter. In another aspect, the beacon signals may utilize a particular frequency, such as 12 GHz. It should be appreciated by those skilled in the art that multiple transponders 132 may be utilized on a single aircraft to provide aircraft attitude, which is generally referred to as the orientation of an aircraft's axes relative to a reference line or plane, such as the horizon.

Figure 2B:
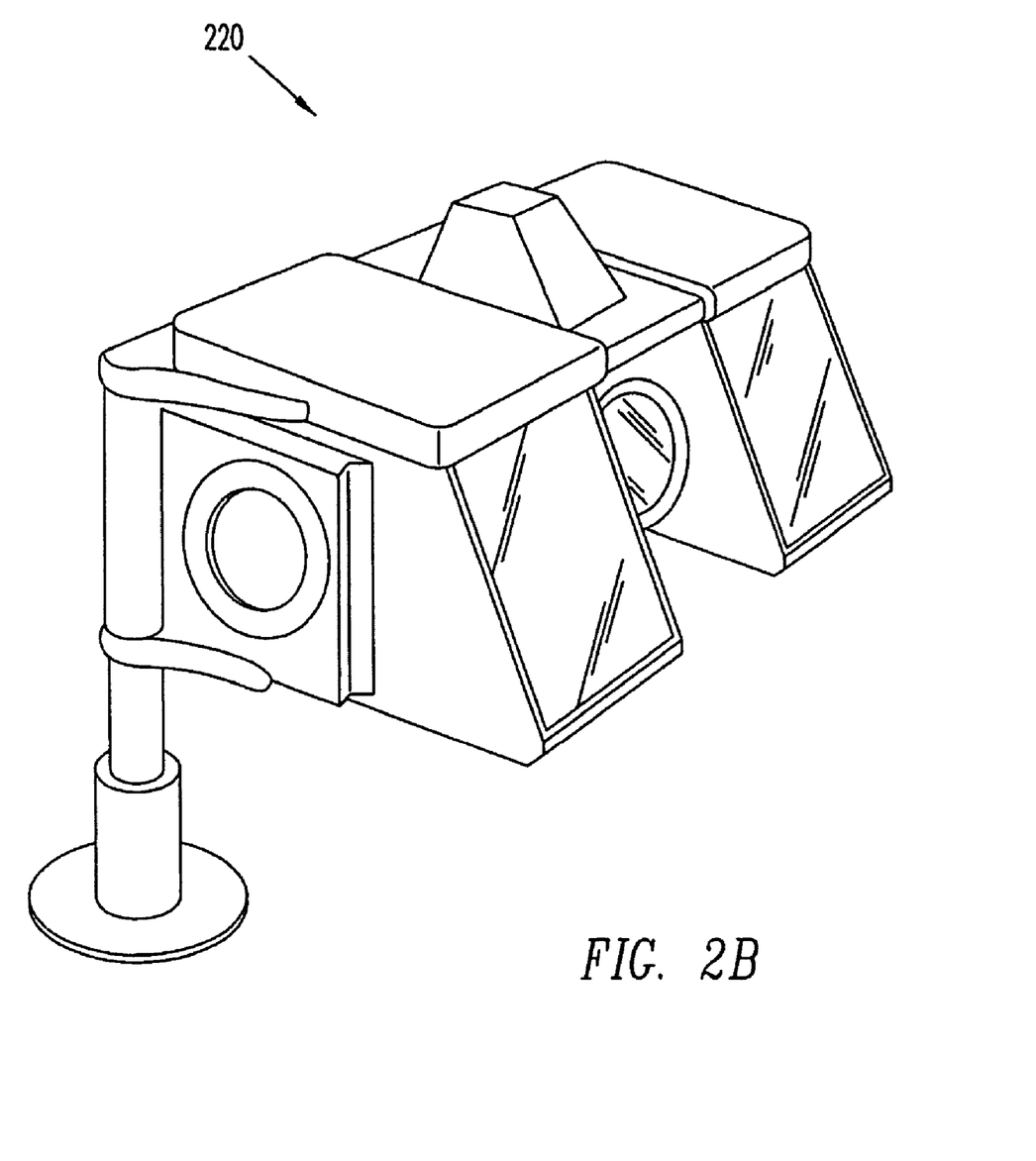
FIG. 2B shows a radar assembly, in accordance with one or more embodiments of the present disclosure.

In one implementation, referring to FIG. 2B, the signal monitoring component 120 comprises a VISAT radar assembly 220 (i.e., a ground-mounted or tower-mounted radar transmitter and receiver). In one aspect, the VISAT radar assembly 220 is adapted to operate with the VISAT beacon assembly 200 of FIG. 2A.

In various embodiments, the interface device 110 and/or signal monitoring component 120 may be implemented using any appropriate combination of hardware and/or software configured for wired and/or wireless communication within the tracking area 150. In various examples, the interface device 110 may be implemented as a network computing device (e.g., a server, a computer, etc.) for the tracking area 150 (e.g., air traffic control area and/or airport terminal area). In other examples, the interface device 110 may be implemented as a wireless telephone (e.g., cellular phone), personal digital assistant (PDA), notebook computer, and/or various other generally known types of wired and/or wireless computing devices. It should be appreciated that, in various embodiments, the interface device 110 may be referred to as a communication hub for the tracking area 150 without departing from the scope of the present disclosure.

In various embodiments, it should be appreciated that the interface device 110 and/or the signal monitoring component 120 may be adapted to communicate with a network, such as a single network or a combination of multiple networks. For example, the network may comprise one or more various types of communication networks, such as satellite networks, landline networks, wireless networks, intranet networks, and/or other appropriate types of communication networks, such as the Internet. In other examples, the network may comprise a wireless telecommunications network (e.g., a satellite telecommunications network, a cellular telephone network, etc.), which may be adapted to communicate with other communication networks, such as an intranet and/or the Internet. Accordingly, the interface device 110 and/or signal monitoring component 120 may be associated with a particular access number (e.g., cellular telephone number) or a particular link (e.g., a link, such as a URL (Uniform Resource Locator) to an IP (Internet Protocol) address).

Referring to FIG. 1A, the system 100 may comprise any number (N) of objects, vehicles, or equipment 130a, 130b, 130c, . . . 130n (i.e., object 1, object 2, object 3, . . . object N) within the tracking area 150. Each object or vehicle 130a, 130b, 130c, . . . 130n may comprise at least one transponder 132a, 132b, 132c, . . . 132n and at least one antenna 134a, 134b, 134c, . . . 134n adapted to transmit beacon signals 140a, 140b, 140c, . . . 140n in the tracking area 150. In one implementation, the transponders 132a, 132b, 132c, . . . 132n comprise a radio frequency (RF) transponder adapted to transmit beacon signals 140a, 140b, 140c, . . . 140n, such as RF beacon signals. In another implementation, each transponder 132a, 132b, 132c, . . . 132n may transmit a particular beacon signal 140a, 140b, 140c, . . . 140n to the VISAT ground receiver components 120, 122 and 126 to indicate a particular position of the particular object 130a, 130b, 130c, . . . 130n within the tracking area 150.

In various embodiments, the one or more objects 130 may comprise one or more aircraft (e.g., commercial, passenger, and/or military airplanes and/or helicopters, etc.), one or more ground based service vehicles (e.g., fuel transport vehicles, luggage transport vehicles, food delivery vehicles, maintenance vehicles, security vehicles, etc.), and various other types of ground based equipment (e.g., forklifts, scissor lifts, etc.). In other embodiments, the objects 130 may include other types of transport equipment, such as containers, trailers, various types of towable equipment, etc.

Referring to FIG. 1A, each of the beacon signals 140a, 140b, 140c, . . . 140n may comprise indentifying information, such as a particular identifier, serial number or code, that identifies the particular object 130a, 130b, 130c, . . . 130n transmitting the particular beacon signal 140a, 140b, 140c, . . . 140n. For example, if a first vehicle 130a is transmitting a first beacon signal 140a in the tracking area 150, then the signal monitoring component 120 receives and transfers the first beacon signal 140a to the interface device 110 for processing the received beacon signal 140a with processing component 112 to determine that the first vehicle 130a is transmitting the first beacon signal 140a. In another example, the interface device 110 may be adapted to further process the received beacon signal 140a with processing component 112 to determine a position or location of the first vehicle 130a within the tracking area 150.

Figure 1B:
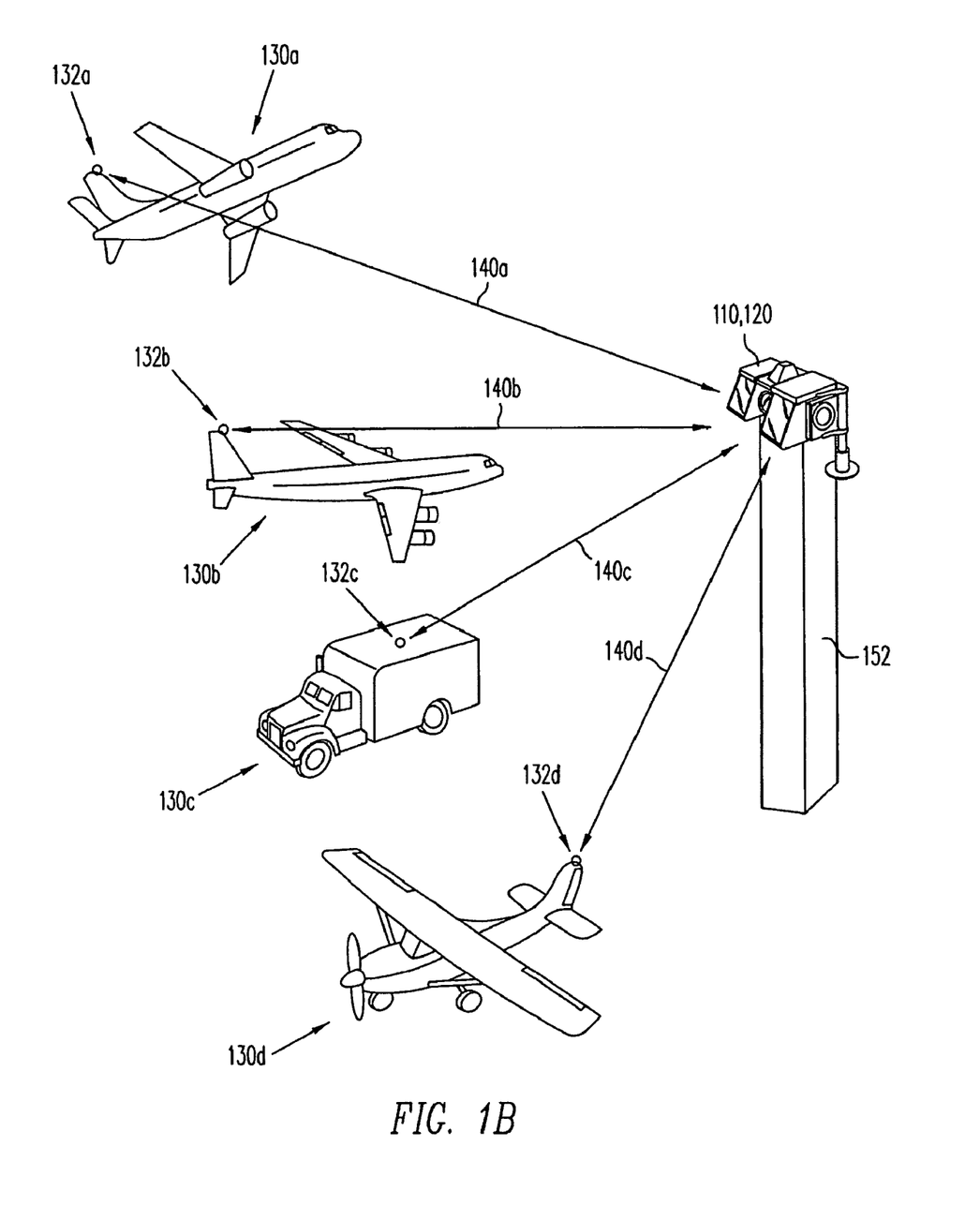

FIG. 1B shows one embodiment of the system 100 having the interface device 110 and signal monitoring component 120 positioned in a tower 152 (e.g., air traffic control tower), wherein the interface device 110 and signal monitoring component 120 is adapted to facilitate tracking of a first object or vehicle 130a (e.g., an in-flight large commercial or passenger aircraft), a second object or vehicle 130b (e.g., a taxing large commercial or passenger aircraft), a third object or vehicle 130c (e.g., a ground service vehicle), and a fourth object or vehicle 130d (e.g., a small commuter aircraft) within the tracking area 150 (e.g., an air traffic control area and/or an airport terminal area).

In various implementations, as shown in FIG. 1B, the first vehicle 130a is equipped with at least one first transponder 132a (e.g., a radio beacon transponder), the second vehicle 130b is equipped with at least one second transponder 132b, the third vehicle 130c is equipped with at least one third transponder 132c, and the fourth vehicle 130d is equipped with at least one fourth transponder 132d. The transponders 132a, 132b, 132c, 132d may be mounted on each vehicle 130a, 130b, 130c, 130d in various places, such as in the tail, rudder, and/or wings of an airplane and in the roof and/or cab of a ground based vehicle. In one aspect, each of the transponders 132a, 132b, 132c, 132d are adapted to uniquely identify each tracked object or vehicle 130a, 130b, 130c, 130d. In another aspect, each beacon signal 140a, 140b, 140c, 140d received from respective transponders 132a, 132b, 132c, 132d may be utilized by the interface device 110 and signal monitoring component 120 to identify the position of each respective vehicle 130a, 130b, 130c, 130d in the tracking area 150.

Figure 2C:
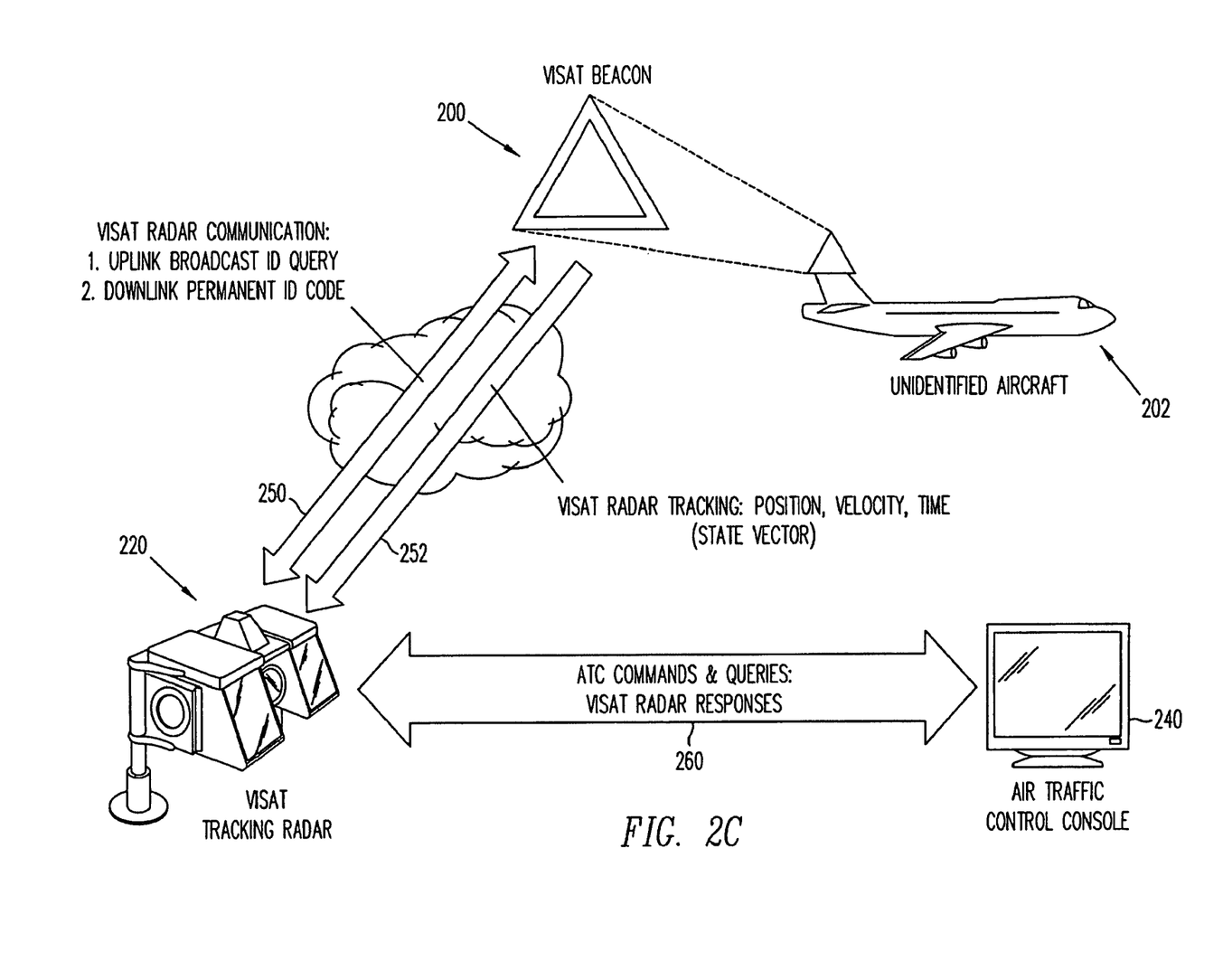
FIG. 2C shows an implementation of the beacon assembly and radar assembly of FIGS. 2A and 2B for monitoring, tracking, and identifying objects, such as aircraft and ground equipment, in accordance with one or more embodiments of the present disclosure.

In one embodiment, the beacon assembly 200 of FIG. 2A (i.e., radar beacon and electronics integrated with anti-collision lamp mounted on an aircraft) is adapted to operate with the radar assembly 220 of FIG. 2B (i.e., a ground-mounted or tower-mounted radar transmitter and receiver). FIG. 2C shows one implementation of the beacon assembly 200 and radar assembly 220 in communication with an air traffic control console 240 for monitoring, tracking, and identifying an aircraft 202.

In one implementation, referring to FIG. 2C, the radar assembly 220 transmits or sends queries to the beacon assembly 200 on the aircraft 202 to establish an uplink/downlink communication channel 250. The beacon assembly 200 on the aircraft 202 receives the query via the uplink/downlink communication channel 250, gathers the queried information (e.g., identification (ID) code) in response to the query, and transmits the information to the radar assembly 220 via the uplink/downlink communication channel 250. Next, the radar assembly 220 processes and sends the received ID code to the air traffic control (ATC) console 240 via another communication link 260 for further processing and viewing by a user, operator, or air traffic controller.

In another implementation, referring to FIG. 2C, the beacon assembly 200 may be adapted to continuously send an RF beacon signal 252 to the radar assembly 220. The VISAT tracking radar 220, via the RF beacon signal, is adapted to measure aircraft range (e.g., accurate to about 1 meter), aircraft azimuth (e.g., accurate to about 200 micro-radians), and aircraft elevation (e.g., accurate to about 200 micro-radians). The beacon assembly 200 and/or radar assembly 220 may be adapted to transmit or send the time that each of these measurements were taken via the uplink/downlink communication channel 250. In one aspect, the radar assembly 220 may be adapted to continuously calculate aircraft velocity vectors in the X, Y, and Z coordinate system based on delta changes in range, azimuth, elevation, and time measurements. The ATC console 240 may be adapted to send queries to the radar assembly 220 for updates on the position and velocity of the aircraft such that the ATC console 240 is continuously updated with tracking information of the aircraft 202.

Figure 3:
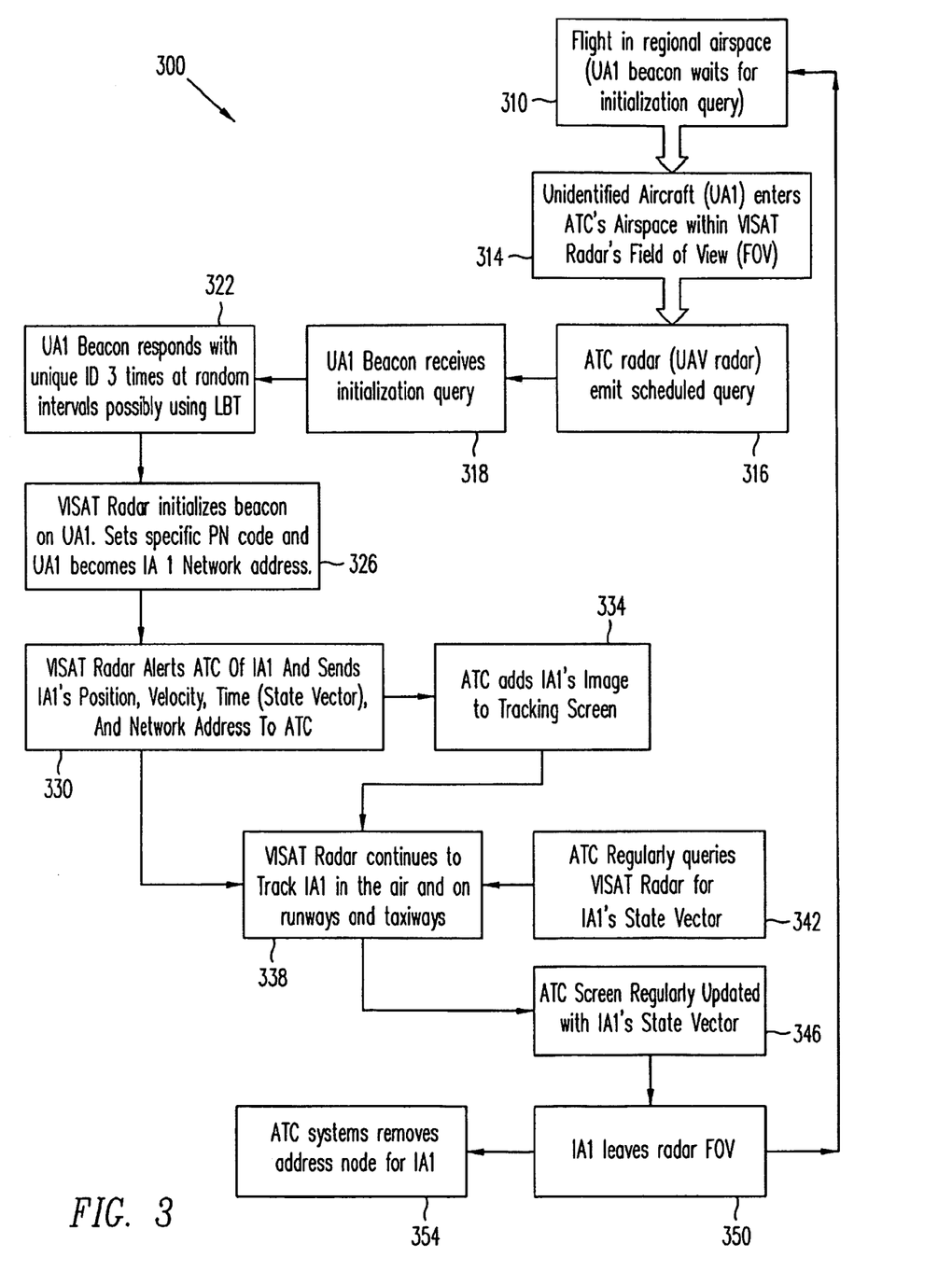
FIG. 3 shows a method for monitoring, tracking, and identifying objects, such as aircraft and ground equipment, in accordance with one or more embodiments of the present disclosure.

FIG. 3 shows one embodiment of a method 300 for continuously monitoring, tracking, and identifying an object, vehicle, aircraft, or equipment while in field of view (FOV) or in the air space of the tracking area, such as air traffic control area or airport terminal area. It should be appreciated that the method 300 may be utilized to monitor, track, and identify an object, vehicle, aircraft, or equipment on the ground. The method 300 of FIG. 3 should be used in conjunction with FIGS. 1A-1B and 2A-2C for ease of discussion.

In one implementation, an unidentified aircraft (UA1) (e.g., aircraft 202 of FIG. 2C) in flight in regional airspace (e.g., tracking area 150 of FIG. 1A) of ATC console 240 (e.g., interface device 110 of FIG. 1A and/or ATC console 240 of FIG.) waits for initialization query from radar assembly 220 (block 310). Next, the unidentified aircraft (UA1) 202 enters the regional airspace of the ATC console 240 within the FOV of the radar assembly 220 (block 314). Next, the radar assembly 220 (e.g., ATC radar) emits a scheduled query (block 316). Next, the beacon assembly 200 on the unidentified aircraft (UA1) 202 receives the initialization query (block 318). Next, the beacon assembly 200 on the unidentified aircraft (UA1) 202 responds (e.g., a plurality of responses, such as 3 times) to the initialization query with a unique ID at random intervals using, e.g., listen before talk (LBT) (block 322). Next, the radar assembly 220 initializes the beacon assembly 200 on the unidentified aircraft (UA1) 202 by setting, e.g., a specific PN code, and the beacon assembly 200 on the unidentified aircraft (UA1) 202 becomes a network address (e.g., IA1) (block 326). Next, the radar assembly 220 alerts the ATC console 240 of the network address IA1 and sends tracking information to the ATC console 240 (block 330). In one aspect, the tracking information includes position, velocity, time (state vector), and network address of the unidentified aircraft (UA1) 202. Next, the ATC console 240 displays an image of the IA1 on the tracking screen (block 334), and the radar assembly 220 continues to track IA1 (i.e., unidentified aircraft (UA1) 202) in airspace, runways, and taxiways (block 338). In one aspect, the ATC console 240 is adapted to regularly query the radar assembly 220 for the state vector of IA1 (i.e., unidentified aircraft (UA1) 202) (block 342). Next, the ATC console 240 is regularly updated with the state vector of IA1 (i.e., unidentified aircraft (UA1) 202) (block 346). Next, in one aspect, if IA1 (i.e., unidentified aircraft (UA1) 202) leaves the FOV of the radar assembly 220 (block 350), then the ATC console 240 removes the network address node for IA1 (i.e., unidentified aircraft (UA1) 202) (block 354).

Figure 4:
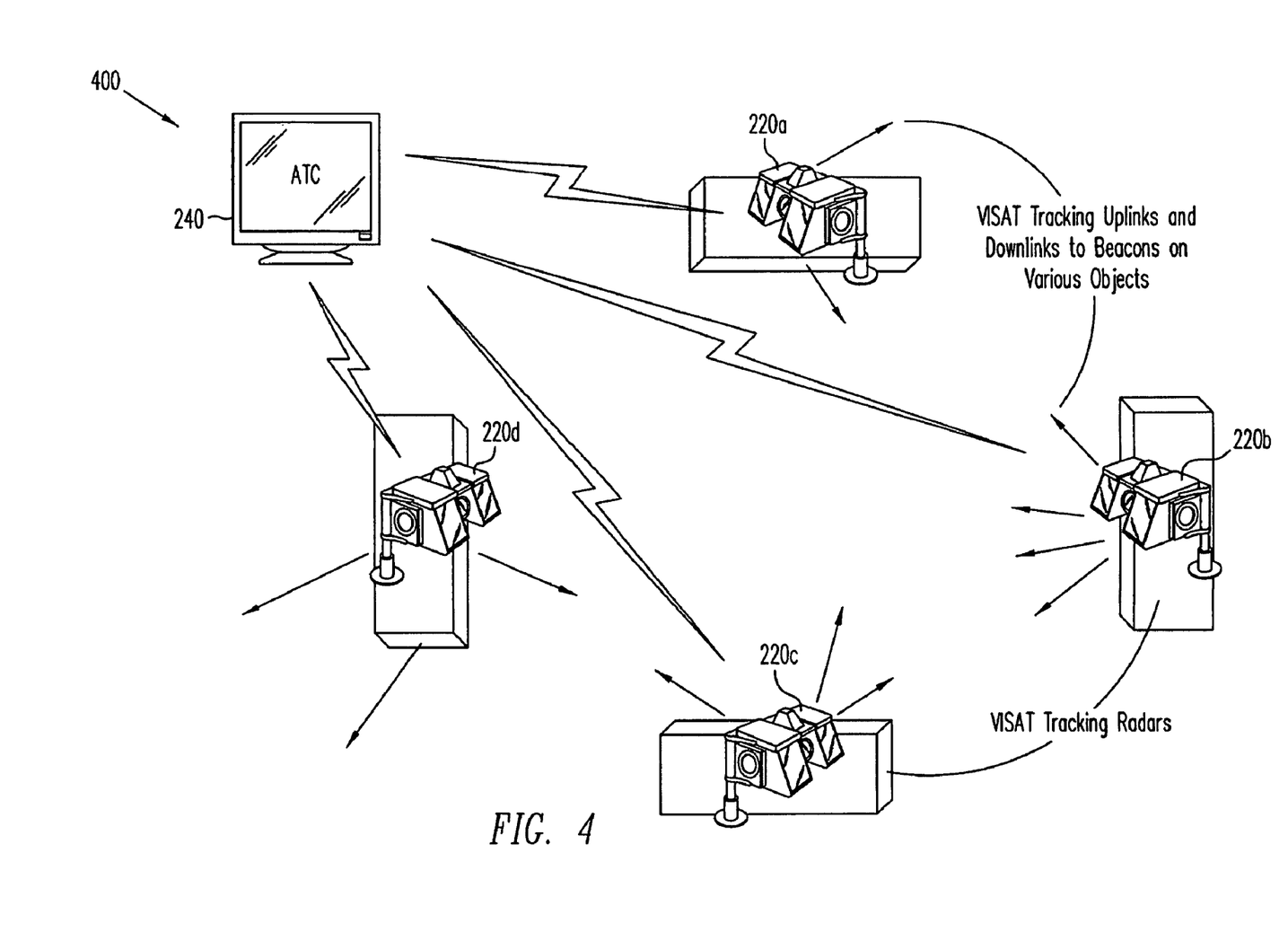
FIG. 4 shows a radar tracking system having a plurality of radar assemblies, in accordance with one or more embodiments of the present disclosure.

FIG. 4 shows one embodiment of a radar system 400 having capability to simultaneously monitor, track, and identify multiple objects, aircraft, vehicles, and equipment in and around a tracking area, such as an air traffic control area and/or an airport terminal area. The radar system 400 may include a plurality of radar assemblies 220a, 220b, 220c, 220d in communication with the ATC console 240 to monitor, track, and identify uplinks and downlinks to beacon assemblies on various objects, aircraft, vehicles, and equipment. In one aspect, one or more of the radar assemblies 220a, 220b, 220c, 220d may be adapted to operate as beacon signal repeaters, as understood in the art, that receive, replicate, and retransmit beacon signals from various objects, aircraft, vehicles, and equipment to the ATC console 240. In another aspect, referring to FIG. 5, multiple radar assemblies 220a, 220b, 220c, 220d within a tracking area may be strategically located to provide efficient and reliable service to the ATC console 240 under crowded and high traffic conditions.

Figure 5:
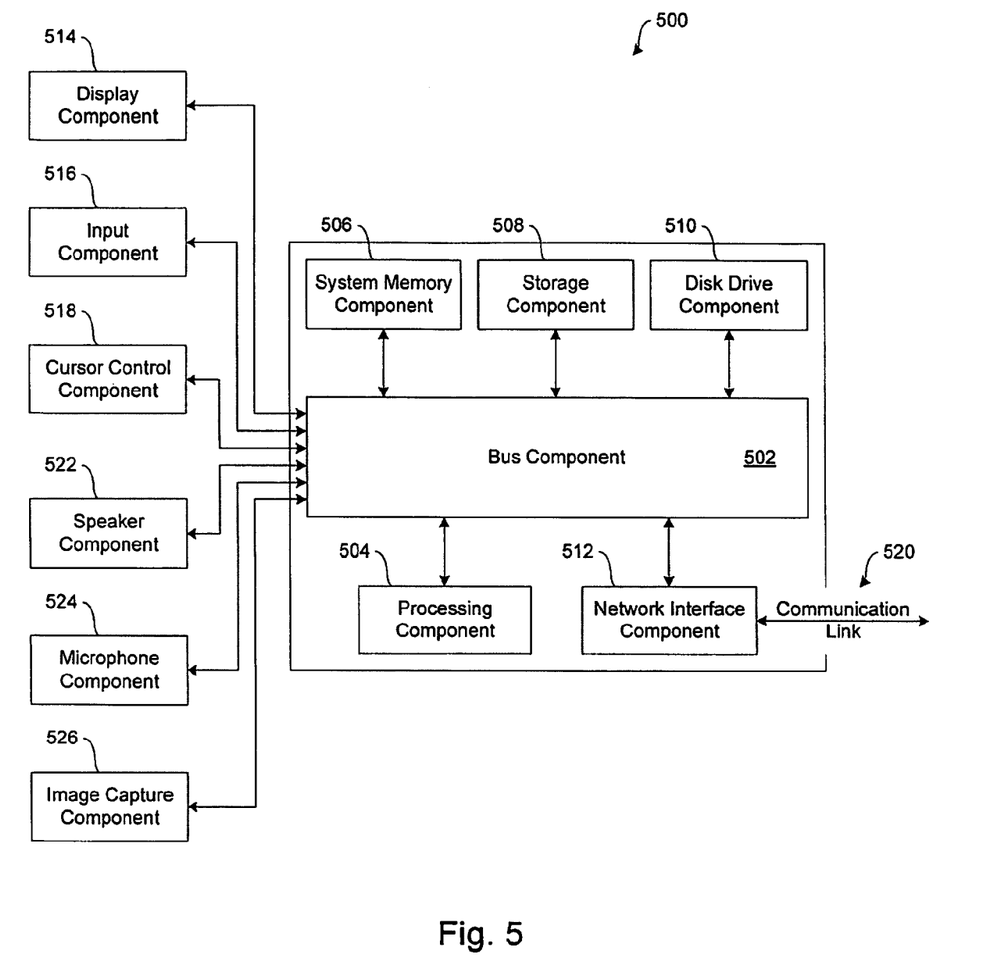
FIG. 5 is a block diagram of a computer related system suitable for implementing one or more embodiments of the present disclosure.

FIG. 5 is a block diagram of a computing apparatus, device, system and/or controller 500 suitable for implementing one or more embodiments of the present disclosure. The computing apparatus 500 may include a bus 502 or other communication mechanism for transferring information, which interconnects subsystems and components, such as processing component 504 (e.g., microprocessor, microcontroller), system memory component 506 (e.g., RAM), static storage component 508 (e.g., ROM), removable memory component 510 (e.g., removable ROM memory, such as EEPROM, smart card, flash memory, etc.), encoder/decoder component 511 (e.g., as described herein, encoder and/or decoder module, application or program), wired or wireless communication interface 512 (e.g., transceiver, modem, or Ethernet card), image display component 514 (e.g., LCD, CRT, etc.), input component 516 (e.g., keyboard, touch screen on display), cursor control component 518 (e.g., mouse button, trackball, etc.), speaker component 522 (e.g., audible sound reproducing device), microphone component 524 (e.g., audible sound capturing device), and image capture component 526 (e.g., image sensing and capturing device, such as optical sensing devices including still image cameras and video cameras).

In accordance with one or more embodiments of the present disclosure, computing apparatus 500 performs specific operations by processor 504 executing one or more sequences of one or more instructions included in system memory component 506. Such instructions may be read into system memory component 506 from another computer readable medium, such as static storage component 508 or removable memory component 510. In other embodiments, hardwired circuitry may be used in place of or in combination with software instructions to implement the present disclosure. In still other embodiments, display component 514 is adapted to display various data and information, such as beacon and radar data and information received from the signal monitoring component 120.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes removable storage media, such as removable memory component 510, volatile media includes dynamic memory, such as system memory component 506, and transmission media including wireless transceivers. In one example, transmission media may take the form of radio waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing apparatus 500. In various other embodiments of the present disclosure, a plurality of computer systems 500 coupled by communication link 520 (e.g., wireless satellite communication link, wireless cellular phone network, wireless or wired LAN, PTSN, or various other wireless networks) may perform instruction sequences to practice the present disclosure in coordination with one another.

Computing apparatus 500 may transmit and receive messages, data, information and instructions, including one or more programs (i.e., application code) through communication link 520 and communication interface 512. Received program code may be executed by processor 504 as received and/or stored in removable memory component 510 or some other non-volatile storage component for execution.

Where applicable, various embodiments of the present disclosure may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system for tracking an object in a tracking area, the system comprising:
   a signal monitoring component adapted to broadcast an initial query to an uninitialized object in response to the uninitialized object entering the tracking area, receive an identification code from a beacon transponder on the uninitialized object in response to the initial query, transmit a pseudo-random (PN) code to the beacon transponder to initialize the object, transmit a beacon query signal to the initialized object and receive the PN code as a beacon response signal, and
   an interface component adapted to monopulse process the received beacon response signal to provide an angle and a range to the initialized object and to assign a network address to the initialized object.

2. The system of claim 1, wherein the object comprises at least one of an aircraft, a vehicle, and ground equipment.

3. The system of claim 1, wherein the tracking area comprises at least one of an airspace and an airport terminal area.

4. The system of claim 1, wherein the signal monitoring component comprises a radar assembly having a radar transmitter and receiver adapted to communicate with the beacon transponder on the object.

5. The system of claim 1, wherein the interface component comprises a processing component adapted to interface with the signal monitoring component to process the received monopulse beacon response signal from the object, initialize the beacon transponder on the object, and assign the network address to the object via the signal monitoring component.

6. The system of claim 1, wherein the beacon transponder is integrated with an anti-collision lamp mounted on the object.

7. The system of claim 1, wherein the signal monitoring component is adapted to transmit the beacon query signal to the beacon transponder on the object via a communication channel and receive the beacon response signal in response to the beacon query signal via the communication channel.

8. The system of claim 1, wherein the beacon response signal includes at least one of identification information related to the object, position information related to the object, velocity information related to the object, and time of response.

9. The system of claim 1, further comprising an air traffic console component adapted to:
   communicate with the interface component;
   receive information related to the beacon response signal from the interface component;
   process the received information; and
   display information related to the object based on the beacon response signal information.

10. A method for tracking an object in a tracking area, the method comprising:
    transmitting an initial query to the object when the object enters the tracking area;
    receiving an identification code from a beacon transponder on the object in response to the transmission of the initial query;
    transmitting a pseudorandom (PN) code to the object in response to the receipt of the identification code;
    transmitting a beacon query to the object;
    receiving the PN code as a beacon response signal from the beacon transponder in response to the transmission of the beacon query signal;
    processing the received beacon response signal to provide an angle and a range to the object; and
    assigning a network address to the object.

11. The method of claim 10, wherein transmitting the beacon query signal to the object comprises transmitting the beacon query signal to the beacon transponder on the object via a communication channel, and wherein receiving the beacon response signal comprises receiving the beacon response signal via the communication channel.

12. The method of claim 10, further comprising displaying information related to the object based on the beacon response signal received from the object.

13. The method of claim 10, wherein the object comprises at least one of an aircraft, a vehicle, and ground equipment.

14. The method of claim 10, the tracking area comprises at least one of an airspace and an airport terminal area.

15. The method of claim 10, wherein the beacon transponder is integrated with an anti-collision lamp mounted on the object.

* * * * *